US010434911B2

United States Patent
Higashihara et al.

(10) Patent No.: US 10,434,911 B2
(45) Date of Patent: Oct. 8, 2019

(54) VEHICLE SEAT INCLUDING A CLOTH SPRING MEMBER

(71) Applicants: TOYOTA JIDOSHA KABUSHIKI KAISHA, Toyota (JP); TOYOTA BOSHOKU KABUSHIKI KAISHA, Kariya (JP)

(72) Inventors: Shota Higashihara, Chiryu (JP); Keisuke Toda, Kariya (JP)

(73) Assignees: TOYOTA JIDOSHA KABUSHIKI KAISHA, Toyota-shi (JP); TOYOTA BOSHOKU KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/717,202

(22) Filed: Sep. 27, 2017

(65) Prior Publication Data

US 2018/0093598 A1    Apr. 5, 2018

(30) Foreign Application Priority Data

Oct. 3, 2016   (JP) .................................. 2016-196020
Mar. 13, 2017  (JP) .................................. 2017-047878

(51) Int. Cl.
| B60N 2/70 | (2006.01) |
| B60N 2/72 | (2006.01) |
| B60N 2/62 | (2006.01) |
| B60N 2/66 | (2006.01) |

(52) U.S. Cl.
CPC .............. *B60N 2/7094* (2013.01); *B60N 2/62* (2013.01); *B60N 2/66* (2013.01); *B60N 2/7011* (2013.01); *B60N 2/72* (2013.01)

(58) Field of Classification Search
CPC ...... B60N 2/7011; B60N 2/7094; B60N 2/62; B60N 2/72
USPC ..................................................... 297/452.56
See application file for complete search history.

(56) References Cited

U.S. PATENT DOCUMENTS

| 4,602,816 A | 7/1986 | Chandler |
| 7,156,457 B2 * | 1/2007 | Fujita ................. B60N 2/42763 |
| | | 297/216.1 |
| 2003/0193231 A1 | 10/2003 | Fujita et al. |
| 2004/0262976 A1 | 12/2004 | Kawasaki |
| 2006/0055216 A1 | 3/2006 | Kawasaki |

(Continued)

FOREIGN PATENT DOCUMENTS

| CN | 1531401 A | 9/2004 |
| EP | 0 177 136 A1 | 4/1986 |
| EP | 1 454 571 A1 | 9/2004 |

(Continued)

*Primary Examiner* — Milton Nelson, Jr.
(74) *Attorney, Agent, or Firm* — Oblon, McClelland, Maier & Neustadt, L.L.P.

(57) ABSTRACT

A vehicle seat includes; a pair of frame members, the frame members forming a frame of at least one of a seat cushion and a seat back and being disposed at positions surrounding a seat region supporting an occupant with an interval therebetween; and a cloth spring member bridged between the frame members to cover the seat region. The cloth spring member has a shorter length in a bridging direction at least on one end side of the frame member in a longitudinal direction of the frame member than in a center portion of the frame member in the longitudinal direction; and the cloth spring member has elasticity.

10 Claims, 16 Drawing Sheets

(56) References Cited

U.S. PATENT DOCUMENTS

2016/0257231 A1    9/2016  Imamura

FOREIGN PATENT DOCUMENTS

| | | |
|---|---|---|
| EP | 1 415 853 B1 | 9/2008 |
| JP | 3965945 B2 | 8/2007 |
| JP | 2014-136472 | 7/2014 |
| JP | 2015-20596 | 2/2015 |
| JP | 2016-97702 | 5/2016 |
| JP | 2016/159007 A | 9/2016 |
| KR | 10-2003-0078029 A | 10/2003 |
| KR | 10-2004-0107578 A | 12/2004 |

* cited by examiner

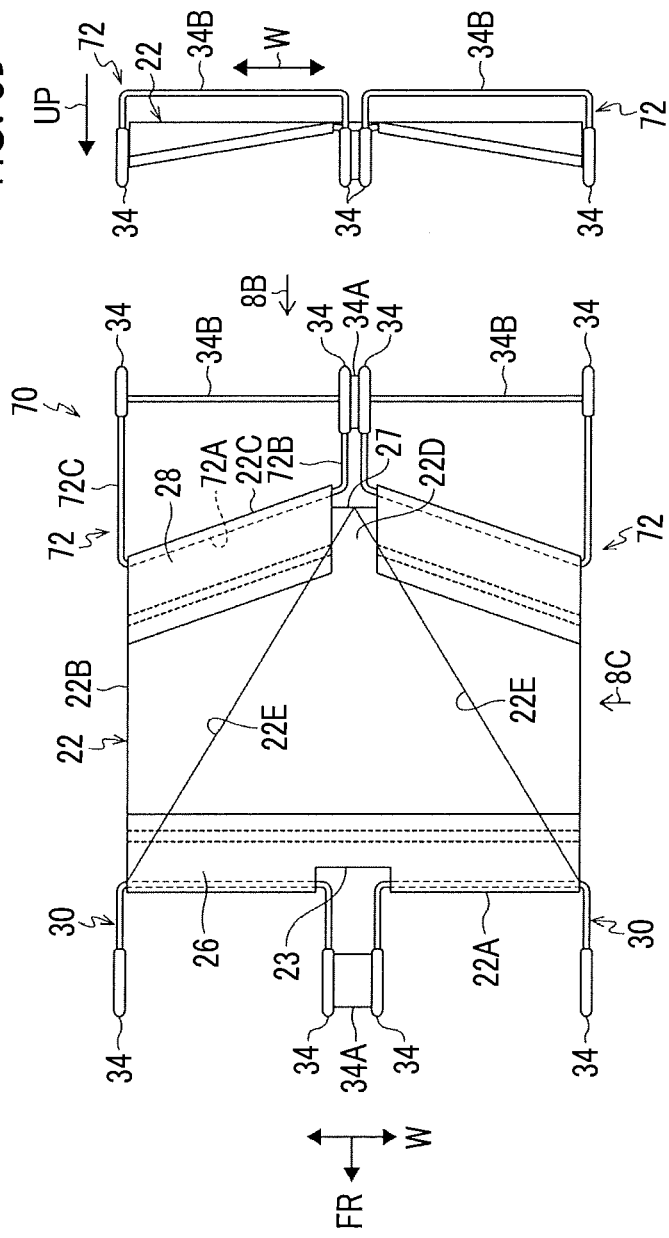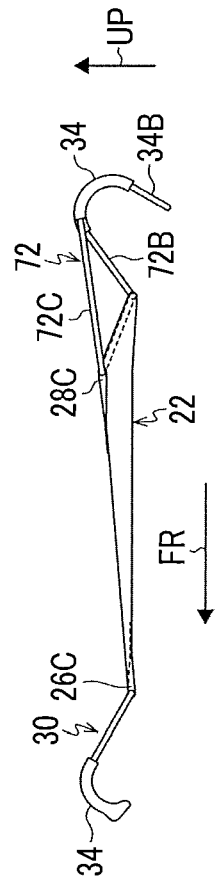

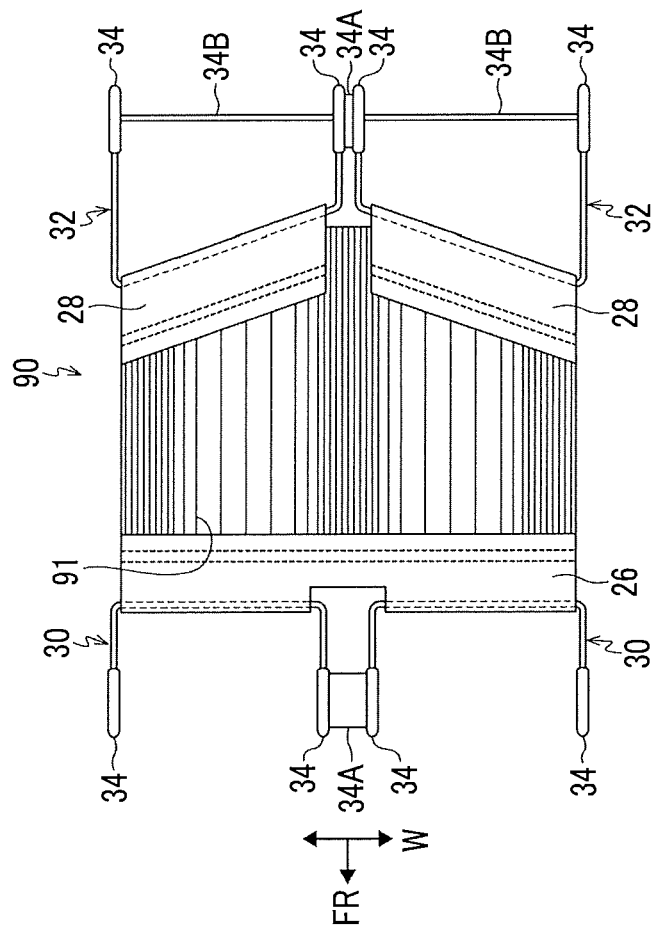

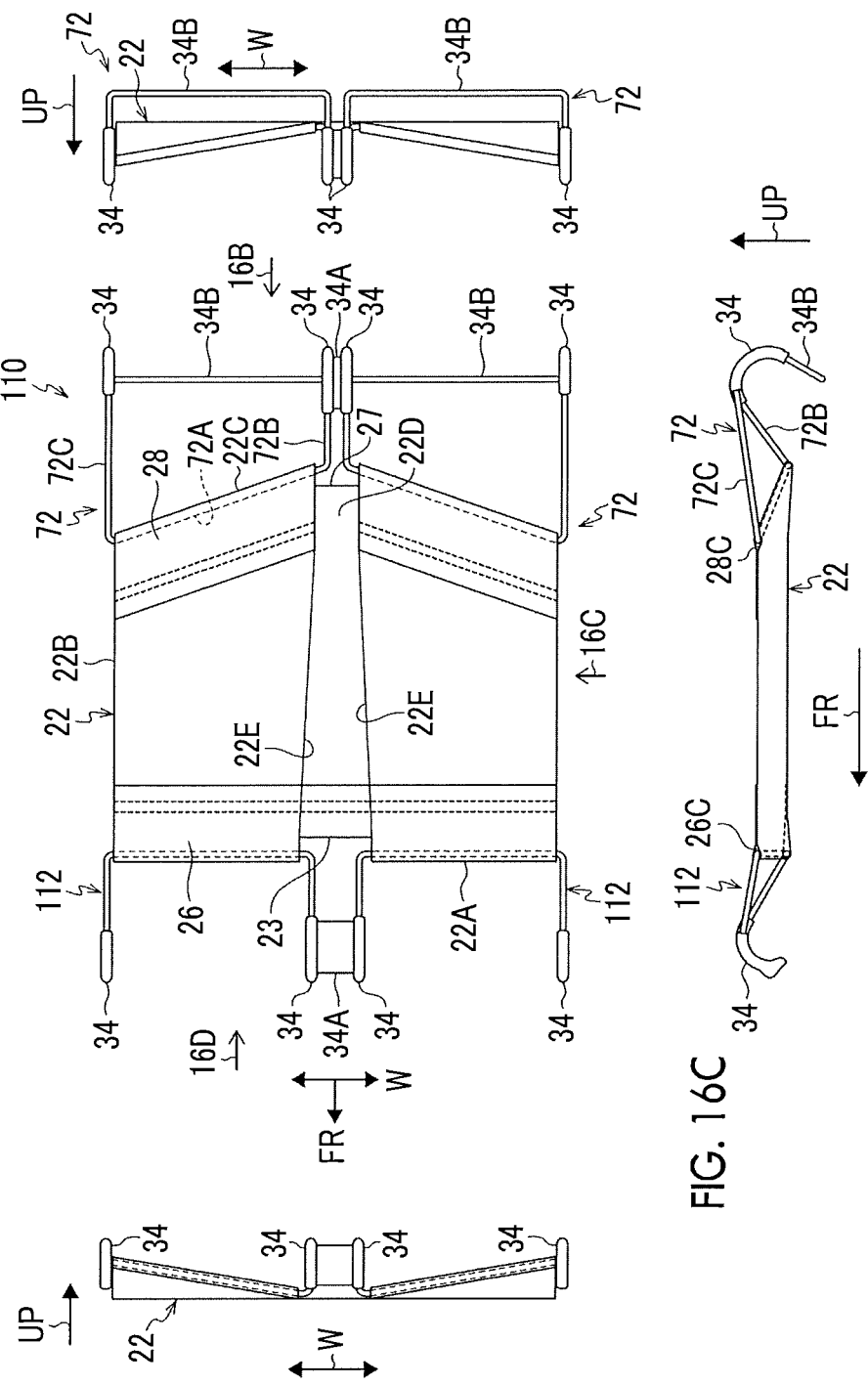

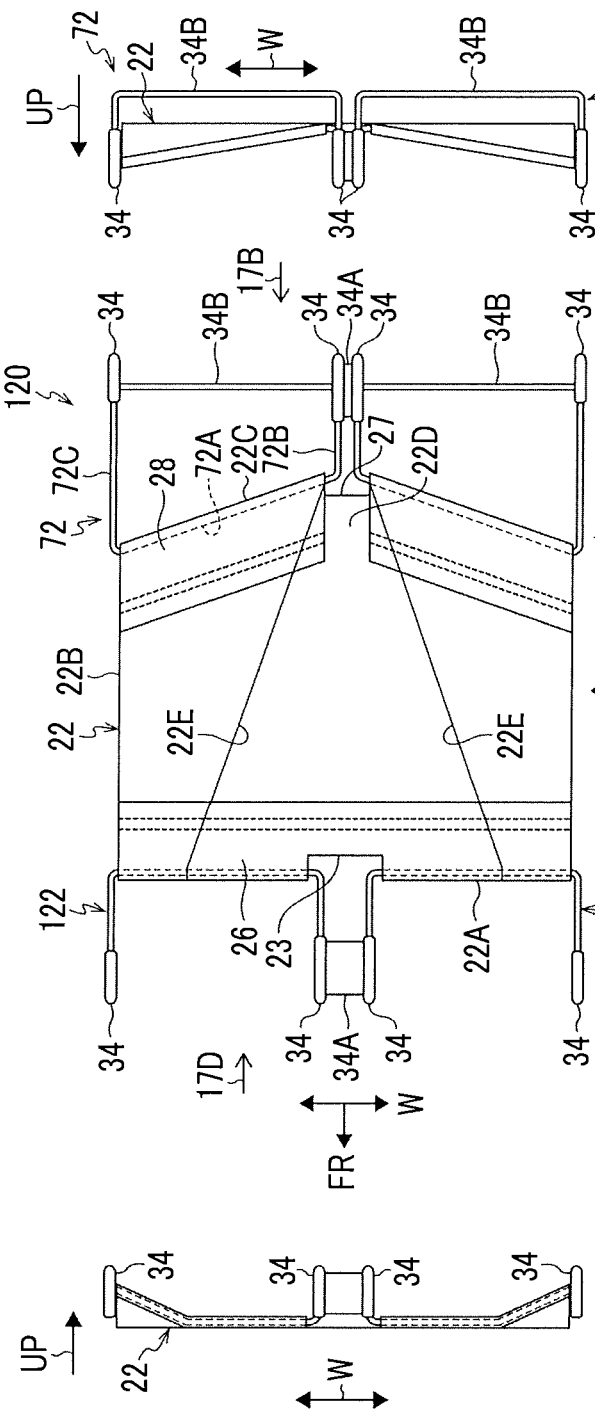

VEHICLE SEAT INCLUDING A CLOTH SPRING MEMBER

INCORPORATION BY REFERENCE

The disclosure of Japanese Patent Application No. 2017-047878 filed on Mar. 13, 2017 including the specification, drawings and abstract is incorporated herein by reference in its entirety.

BACKGROUND

1. Technical Field

The disclosure relates to a vehicle seat.

2. Description of Related Art

Regarding a cushion member of a vehicle seat, a technique using a net member as a cloth spring has been developed. For example, Japanese Unexamined Patent Application Publication No. 2015-20596 (JP 2015-20596 A) discloses, for a seat cushion on which an occupant is seated, a vehicle seat structure having a pair of side frames, U-shaped pipe frames disposed between the side frames, and a cloth spring (net material) stretched between the pipe frames. As described above, by using the cloth spring as the cushion member, a reduction in the weight of the cushion member can be achieved compared to a urethane pad, a metal spring, or the like. Furthermore, in the configuration disclosed in JP 2015-20596 A, the tension of the cloth spring is ensured by using the pipe frames having high rigidity.

In the case of using the cloth spring as described above, the tension of the cloth spring can be ensured in a direction in which the cloth spring is bridged. However, in an in-plane direction of the cloth spring perpendicular to the direction in which the cloth spring is bridged (bridging direction), the end portions of the cloth spring becomes free ends. In a direction in which the free ends of the cloth spring face each other, no tension is applied even when a load is applied as an occupant is seated, and it is difficult to restrict the movement of the seated occupant. That is, in the direction of the cloth spring perpendicular to the bridging direction, it is difficult to control the deformation of the cloth spring.

SUMMARY

The disclosure provides a vehicle seat capable of changing the deformation amount of a cloth spring member with respect to the load of a seated occupant even in an in-plane direction of the cloth spring member perpendicular to the bridging direction of the cloth spring member.

A first aspect of the disclosure relates to a vehicle seat including: a pair of frame members, the frame members forming a frame of at least one of a seat cushion and a seat back and being disposed at positions surrounding a seat region supporting an occupant with an interval therebetween; and a cloth spring member bridged between the frame members to cover the seat region. The cloth spring member has a shorter length in a bridging direction at least on one end side of the frame member in a longitudinal direction of the frame member than in a center portion of the frame member in the longitudinal direction, and the cloth spring member has elasticity.

With the vehicle seat according to the aspect, the frame members are disposed with an interval therebetween at positions surrounding the seat region supporting the occupant. The frame members form the frame of at least one of the seat cushion and the seat back. The cloth spring member has elasticity and is bridged between the frame members to cover the seat region. In addition, the cloth spring member has a shorter length in the bridging direction at least on one end side of the frame member in the longitudinal direction of the frame member than in the center portion of the frame member in the longitudinal direction. Accordingly, one end side of the cloth spring member has a higher elastic modulus than the center portion of the cloth spring member. Here, the elastic modulus means Young's modulus. As described above, the elastic modulus of one end side of the cloth spring member is higher than that of the center portion. Accordingly, one end side of the cloth spring member is less likely to deform under the load of the seated occupant, thereby reducing the deformation amount. In addition, "the length in the bridging direction" of the cloth spring member in the aspect of the disclosure means the length of a portion of the cloth spring member in a state in which the cloth spring member is bridged, that is, the length of a portion of the cloth spring member that can exert an elastic force in the state in which the cloth spring member is bridged.

In the vehicle seat according to the aspect, the seat region may be include a seating region supporting the thigh of the occupant from a lower side. The frame members may be include a pair of cushion front-rear frames extending in a seat-width direction with an interval therebetween in a seat front-rear direction at positions surrounding the seating region. The length in the seat front-rear direction of the cloth spring member bridged between the cushion front-rear frames may be decrease toward an outer side in the seat-width direction from a center portion of the cloth spring member in the seat-width direction.

With the vehicle seat according to the aspect, the frame members extend in the seat-width direction with an interval therebetween in the seat front-rear direction at positions surrounding the seating region supporting the thigh of the occupant from the lower side. In addition, the length of the cloth spring member bridged in the seat front-rear direction decreases from the center portion in the seat-width direction toward the outer side in the seat-width direction of the cloth spring member. Therefore, the elastic modulus of the cloth spring member is higher on the outer side in the seat-width direction than at the center portion in the seat-width direction, and the deformation amount of the cloth spring member due to the load of the seated occupant is smaller on the outer side in the seat-width direction than at the center portion in the seat-width direction. Accordingly, the movement of the seated occupant in the seat-width direction can be restricted.

In the vehicle seat according to the aspect, the seat region may include a seating region supporting the thigh of the occupant from a lower side. The frame members may include a pair of cushion side frames extending in a seat front-rear direction with an interval therebetween in a seat-width direction at positions surrounding the seating region. The length in the seat-width direction of the cloth spring member bridged between the cushion side frames may increase toward a seat front side from a seat rear side in the seat front-rear direction.

With the vehicle seat according to the aspect, the frame members extend in the seat front-rear direction with an interval therebetween in the seat-width direction at positions surrounding the seating region supporting the thighs of the occupant from the lower side. In addition, the cloth spring member bridged in the seat-width direction increases in length in the seat-width direction from the seat rear side toward the seat front side and increases in elastic modulus toward the seat rear side. Since the load of the seated occupant on the cloth spring member is larger on the hip side than on the thigh side, by increasing the elastic modulus on the seat rear side, the cloth spring member can stably receive the load of the seated occupant.

In the vehicle seat according to the aspect, a portion of the cloth spring member, which has a lower height in a seat up-down direction than both ends of the cloth spring member in the seat-width direction, may be formed at least on a seat rear side of the cloth spring member.

With the vehicle seat according to the aspect, the portion having a lower height in the seat up-down direction than both ends of the cloth spring member in the seat-width direction is formed at least on the seat rear side of the cloth spring member. The portion having a low height in the seat up-down direction has a lower deformation start position (bending start position) with respect to the load of the seated occupant than both ends of the cloth spring member in the seat-width direction, and thus the seating pressure of at least the hip side of the seated occupant can be locally reduced.

In the vehicle seat according to the aspect, the seat region may include a back region supporting a back of the occupant. The frame members may include up-down back frames extending in a seat-width direction with an interval therebetween in a seat up-down direction at positions surrounding the back region. The length in a seat up-down direction of the cloth spring member bridged between the up-down back frames may decrease toward an outer side in the seat-width direction from the center portion of the cloth spring member in the seat-width direction.

With the vehicle seat according to the aspect, the frame members extend in the seat-width direction with an interval therebetween in the seat up-down direction at positions surrounding the back region supporting the back of the occupant. In addition, the length of the cloth spring member bridged in the seat-width direction decreases from the center portion in the seat-width direction toward the outer side in the seat-width direction of the cloth spring member. Therefore, the elastic modulus of the cloth spring member is higher on the outer side in the seat-width direction than at the center portion in the seat-width direction, and the deformation amount of the cloth spring member due to the load of the seated occupant is smaller on the outer side in the seat-width direction than at the center portion in the seat-width direction. Accordingly, the movement of the seated occupant in the seat-width direction can be restricted.

In the vehicle seat according to the aspect, the seat region may include a back region supporting a back of the occupant. The frame members may include back side frames extending in a seat up-down direction with an interval therebetween in a seat-width direction at positions surrounding the back region. The length in a seat-width direction of the cloth spring member bridged between the back side frames may increase toward a seat upper side from a seat lower side in the seat up-down direction.

With the vehicle seat according to the aspect, the frame members extend in the seat up-down direction with an interval therebetween in the seat-width direction at positions surrounding the back region supporting the back of the occupant. In addition, the cloth spring member bridged in the seat-width direction increases in length toward the seat upper side from the seat lower side and decreases in elastic modulus toward the seat upper side. As described above, by decreasing the elastic modulus toward the seat upper side, the cushioning performance when the seated occupant rests on the vehicle seat can be enhanced.

The vehicle seat according to the aspect may further include: a wire that supports an end edge of the cloth spring member; and an attachment member that causes the wire to be attached to the frame member. An annular portion may be formed in the cloth spring member by folding and sewing the end edge of the cloth spring member along the frame member. The wire may be inserted into the annular portion to support the end edge of the cloth spring member.

According to the aspect, in the cloth spring member of the vehicle seat, the annular portion is formed by folding and sewing the end edge of the cloth spring member along the frame member. By inserting the wire into the annular portion, the end edge of the cloth spring member can be easily supported. In addition, by attaching the wire to the frame member with the attachment member, the cloth spring member can be easily attached to the frame member with the wire.

In the vehicle seat according to the aspect, a pair of the wires may be provided, the wires being disposed with an interval therebetween in the seat-width direction. A curved portion that is convex toward a seat lower side as viewed in the seat-width direction may be formed on the seat rear side of the wire.

With the vehicle seat according to the aspect, the curved portion which is convex toward the seat lower side as viewed in the seat-width direction is formed on the seat rear side of the wire. Therefore, the portion of the cloth spring member corresponding to the curved portion tends to fit the hips of the seated occupant and thus can restrict the movement of the seated occupant in the seat front-rear direction.

In the vehicle seat according to the aspect, the curved portions that are curved in arc shapes in directions away from each other on the seat rear side may be formed in the wires.

In the vehicle seat according to the aspect, a density of warp yarns of an elastic fiber forming the cloth spring member may be higher on the seat front side than on the seat rear side and may be lower on the seat rear side.

In the vehicle seat according to the aspect, a density of warp yarns of an elastic fiber forming the cloth spring member may be higher at the center portion and both end portions of the cloth spring member in the seat-width direction than between the center portion and both the end portions of the cloth spring member in the seat-width direction and may be low between the center portion and both the end portions of the cloth spring member in the seat-width direction.

In the vehicle seat according to the aspect, the seat region may include a back region supporting a back of the occupant. The frame members may include back side frames extending in a seat up-down direction with an interval therebetween in a seat-width direction at positions surrounding the back region. The vehicle seat may further include a wire that supports an end edge of the cloth spring member, and an attachment member that causes the wire to be attached to the back side frame. An annular portion may be formed in the cloth spring member by folding and sewing the end edge of the cloth spring member along the back side frame. The wire may be inserted into the annular portion to support the end edge of the cloth spring member.

In the vehicle seat according to the aspect, first curved portions curved in arc shapes in directions away from each other may be formed in the wires from a seat lower side toward an intermediate portion of the wires. Second curved portions curved in arc shapes in directions away from each other may be formed in the wires from the intermediate portion of the wires toward a seat upper side. The first curved portions may be curved to be convex toward the seat upper side from the seat lower side.

In the vehicle seat according to the aspect, a density of weft yarns of an elastic fiber forming the cloth spring member may be higher in the first curved portions than in the second curved portions and may be lower in the second curved portions.

With the vehicle seat according to the aspect, in the direction perpendicular to the bridging direction, the deformation amount of one end side or both end sides of the cloth spring member due to the load of the seated occupant can be smaller than that of the center portion of the cloth spring member.

With the vehicle seat according to the aspect, by causing the elastic modulus of the cloth spring member to be high at both ends in the seat-width direction, the movement of the seated occupant in the seat-width direction can be restricted.

With the vehicle seat according to the aspect, by causing the elastic modulus of the cloth spring member to be high on the seat rear side, the load of the seated occupant can be stably received by the cloth spring member.

With the vehicle seat according to the aspect, the seating pressure of the hip side of the seated occupant can be locally reduced.

With the vehicle seat according to the aspect, by causing the elastic modulus of the cloth spring member to be high at both ends in the seat-width direction, the movement of the seated occupant in the seat-width direction can be restricted.

With the vehicle seat according to the aspect, by causing the elastic modulus of the cloth spring member to be low on the seat upper side, the cushioning performance when the seated occupant rests on the vehicle seat can be enhanced.

With the vehicle seat according to the aspect, the cloth spring member can be easily attached to the frame member.

With the vehicle seat according to the aspect, the movement of the seated occupant in the seat front-rear direction can be restricted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a plan view of a cloth spring unit of a vehicle seat according to a third embodiment;

FIG. 8B is a view of the cloth spring unit in FIG. 8A when viewed from the arrow 8B;

FIG. 8C is a view of the cloth spring unit in FIG. 8A when viewed from the arrow 8C;

FIG. 13 is a plan view of a modification example of the cloth spring unit of the vehicle seat according to the fourth embodiment;

FIG. 16A is a plan view of a cloth spring unit of a vehicle seat according to another embodiment;

FIG. 16B is a view of the cloth spring unit in FIG. 16A when viewed from the arrow 16B;

FIG. 16C is a view of the cloth spring unit in FIG. 16A when viewed from the arrow 16C;

FIG. 16D is a view of the cloth spring unit in FIG. 16A when viewed from the arrow 16D;

FIG. 17A is a plan view of a cloth spring unit of a vehicle seat according to another embodiment;

FIG. 17B is a view of the cloth spring unit in FIG. 17A when viewed from the arrow 17B;

FIG. 17C is a view of the cloth spring unit in FIG. 17A when viewed from the arrow 17C; and FIG. 17D is a view of the cloth spring unit in FIG. 17A when viewed from the arrow 17D.

DETAILED DESCRIPTION OF EMBODIMENTS

First Embodiment

Hereinafter, a first embodiment of a vehicle seat according to the aspects of the disclosure will be described with reference to FIGS. 1 to 4. Arrows FR, W, UP shown in the figures respectively indicate a forward direction in a seat front-rear direction, a seat-width direction, and an upward direction in a seat up-down direction.

Figure 1:
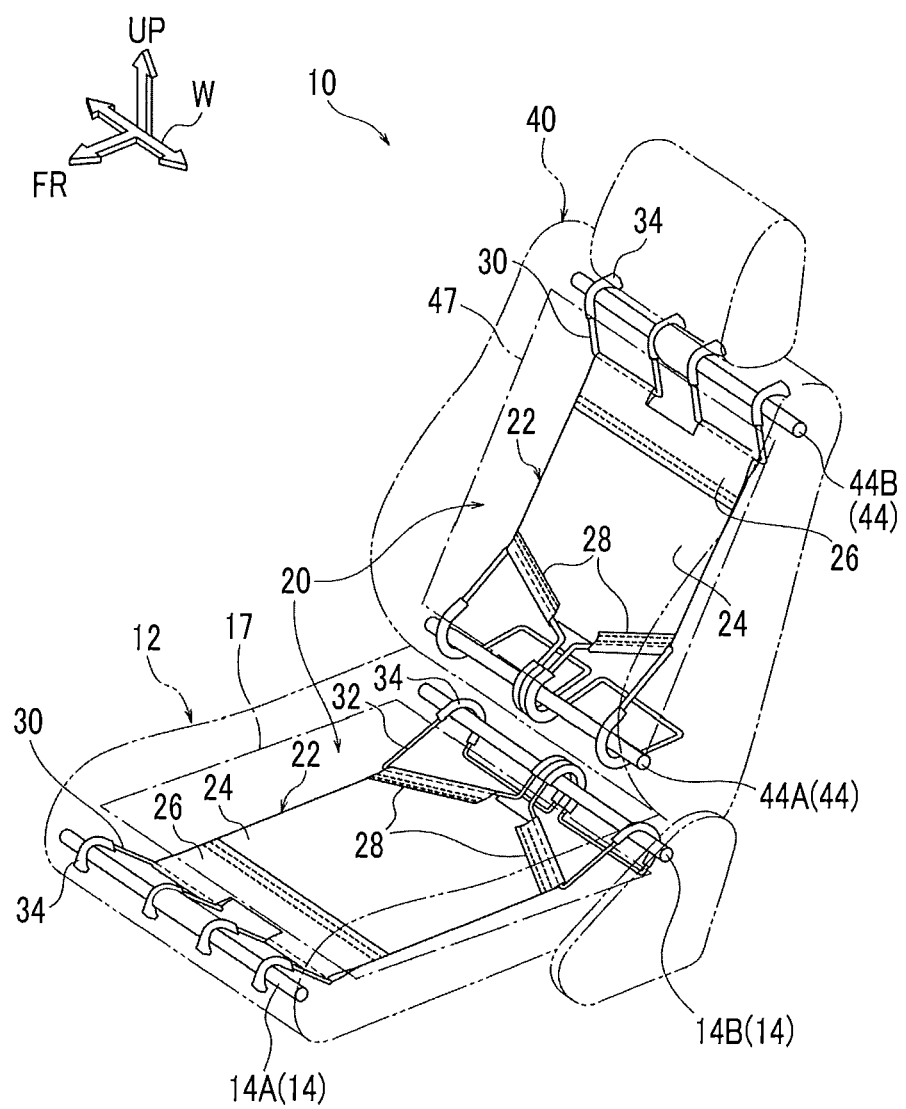
FIG. 1 is an overall schematic perspective view of a vehicle seat and a cloth spring unit according to a first embodiment.

As illustrated in FIG. 1, a vehicle seat 10 includes a seat cushion 12 on which an occupant is seated, and a seat back 40 that stands upright on the rear end portion of the seat cushion 12 to support the upper part of the body of the occupant. The seat cushion 12 supports the thighs of the occupant from the lower side of the thighs.

In the seat cushion 12, cushion front-rear frames 14 forming a pair are respectively disposed at both ends of the seat cushion 12 in the seat front-rear direction. The cushion front-rear frames 14 are disposed outward of both sides in the seat front-rear direction of a seating region 17 for the occupant as an example of a seat region with an interval therebetween. The cushion front-rear frames 14 extend along the seat-width direction and form the frames of the seat cushion 12. The cushion front-rear frame 14 on a front side is referred to as a front cushion frame 14A, and the cushion front-rear frame 14 on a rear side is referred to as a rear cushion frame 14B. A cloth spring unit 20 is bridged between the cushion front-rear frames 14.

Figure 2:
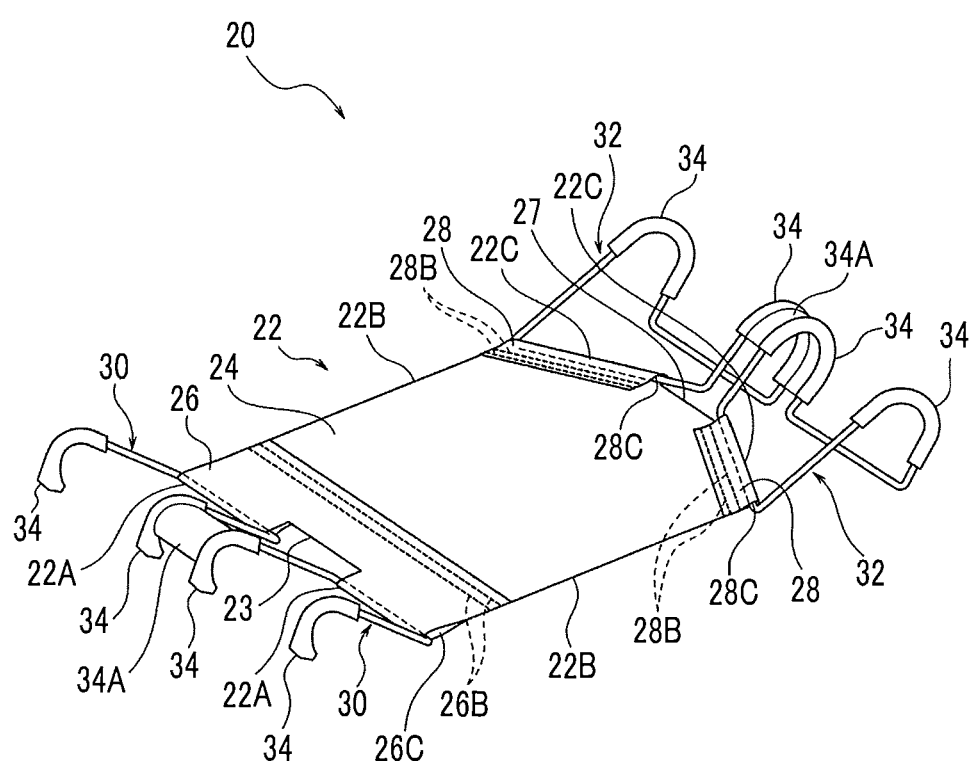
FIG. 2 is a perspective view of the cloth spring unit of the vehicle seat according to the first embodiment.

As also illustrated in FIG. 2, the cloth spring unit 20 includes a cloth spring member 22, first wires 30, second wires 32, and hooks 34.

Figure 3:
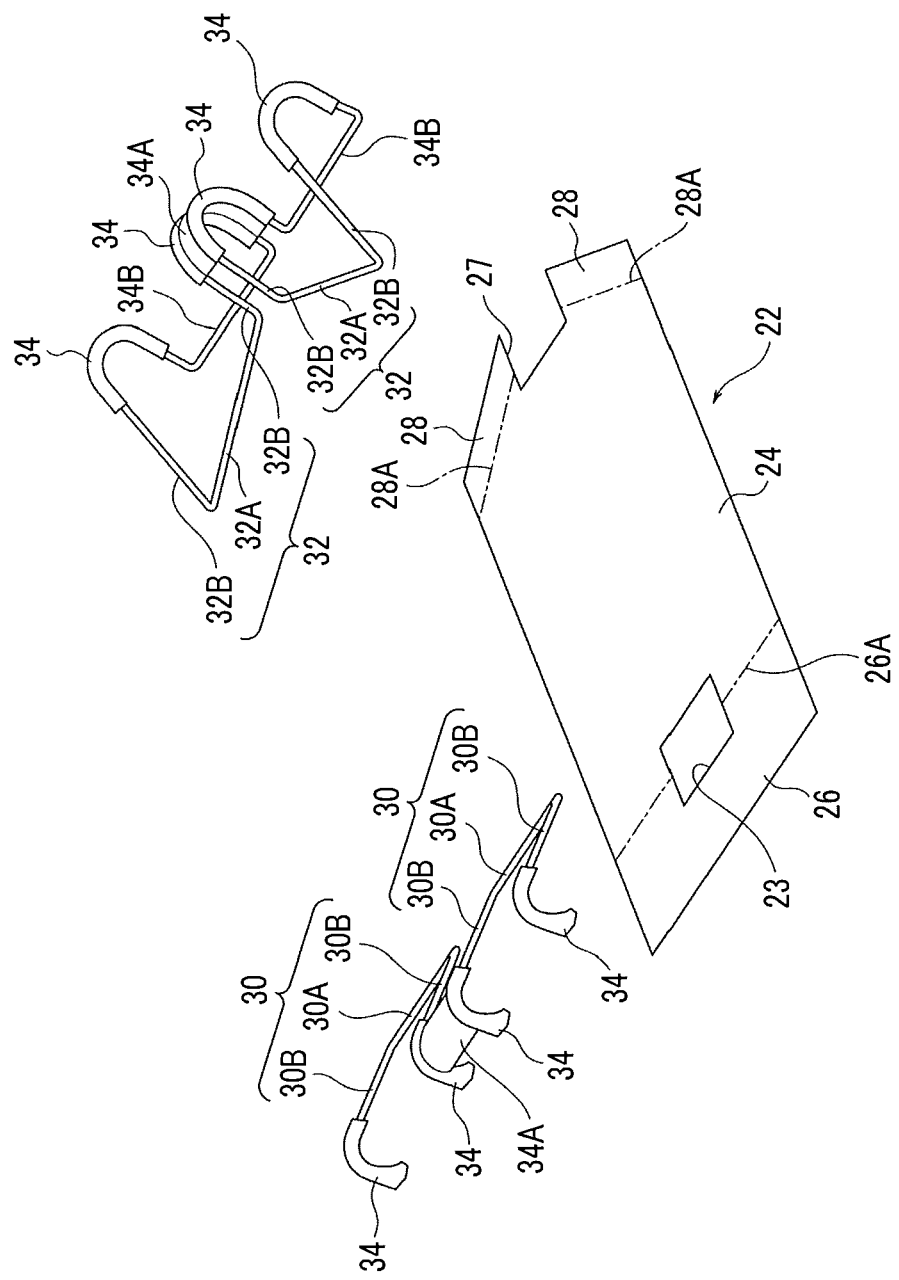
FIG. 3 is an exploded perspective view of the cloth spring unit of the vehicle seat according to the first embodiment.

The cloth spring member 22 is formed of an elastic cloth material such as elastic fabric, and as illustrated in FIG. 3, includes a cloth spring body portion 24, a first end portion 26, and a second end portion 28. The first end portion 26 is disposed on the seat front side and the second end portion 28 is disposed on the seat rear side with the cloth spring body portion 24 interposed therebetween.

The first end portion 26 is folded back toward the second end portion 28 at a folding line 26A and is sewn to the cloth spring body portion 24 at a sewing line 26B as illustrated in FIG. 2. On a side closer to the folding line 26A than the sewing line 26B, annular portions 26C are formed by sewing the first end portion 26 to the cloth spring body portion 24. An opening 23 is formed at a position corresponding to the center portion of the folding line 26A in a longitudinal direction of the folding line 26A.

As illustrated in FIG. 3, the second end portion 28 is formed on both sides in the seat-width direction across a cutout 27 formed at the center of the second end portion 28 in the seat-width direction. The second end portion 28 is inclined such that the outer sides thereof in the seat-width direction are directed toward the first end portion 26 in the plan view. The second end portion 28 is folded back toward the first end portion 26 at a folding line 28A and is sewn to the cloth spring body portion 24 at a sewing line 28B as illustrated in FIG. 2. On a side closer to the second end portion 28 than the sewing line 28B, annular portions 28C are formed by sewing the second end portion 28 to the cloth spring body portion 24. A second end edge 22C of the cloth spring member 22, which will be described later, is formed by the folding line 28A.

As illustrated in FIG. 2, the cloth spring member 22 includes, as outer edges in a plan view, a first end edge 22A disposed on the seat front side, side end edges 22B disposed on both sides in the seat-width direction, and the second end edge 22C disposed on the seat rear side. The first end edge 22A is disposed along the seat-width direction, and the side end edges 22B are disposed along the seat front-rear direction. The second end edge 22C is disposed along the folding line 28A and is inclined such that the outer sides of the second end edge 22C in the seat-width direction are directed toward the seat front side.

The first wires 30 are attached to the annular portions 26C of the cloth spring member 22. As illustrated in FIG. 3, the first wire 30 includes an insertion portion 30A and bridge portions 30B bent from both end portions of the insertion portion 30A. The insertion portion 30A is inserted into the annular portion 26C, and the bridge portions 30B extend outward of the cloth spring member 22 in the seat front-rear direction. The first wires 30 are respectively provided on both sides with the opening 23 interposed therebetween.

The hook 34 is provided at the tip portion of each of the bridge portions 30B. The hook 34 has a hook shape and is hooked to the front cushion frame 14A. The hooks 34 provided at the bridge portions 30B that are adjacent to each other with the opening 23 interposed therebetween are connected by a connection portion 34A.

The second wires 32 are attached to the annular portions 28C of the cloth spring member 22. As illustrated in FIG. 3, the second wire 32 includes an insertion portion 32A and bridge portions 32B bent from both end portions of the insertion portion 32A. The insertion portion 32A is inserted into the annular portion 28C, and the bridge portions 32B extend outward of the cloth spring member 22 in the seat front-rear direction. The second wires 32 are respectively provided on both sides with the cutout 27 interposed therebetween. The length of the bridge portion 32B disposed on a center side in the seat-width direction is shorter than the length of the bridge portion 32B disposed on the outer side in the seat-width direction.

The hook 34 is provided at the tip portion of each of the bridge portions 32B. The hook 34 has a hook shape and is hooked to the rear cushion frame 14B. The tips of the hooks 34 of the second wires 32 are connected by connection portions 34B. In addition, the hooks 34 provided at the bridge portions 32B that are adjacent to each other with the cutout 27 interposed therebetween are connected by the connection portion 34A.

Figure 4:
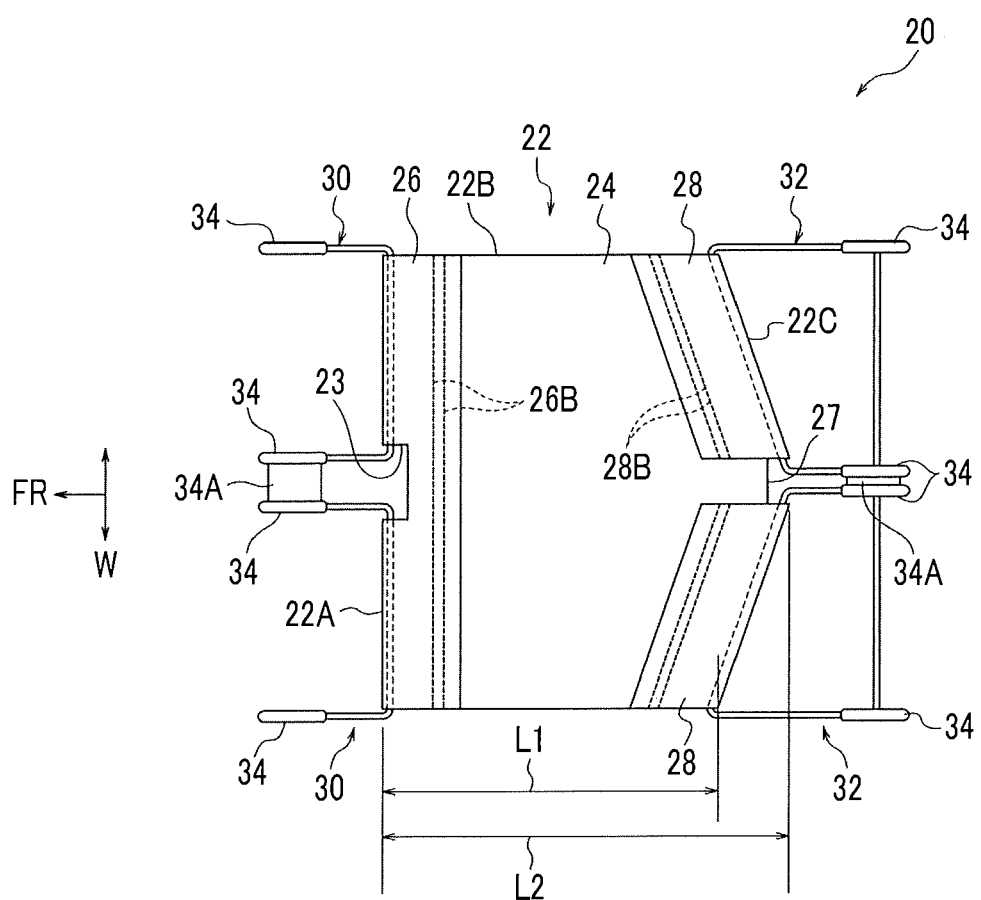
FIG. 4 is a plan view of the cloth spring unit of the vehicle seat according to the first embodiment.

The first end portion 26 side of the cloth spring member 22 is attached to the front cushion frame 14A via the first wires 30 and the hooks 34. In addition, the second end portion 28 side of the cloth spring member 22 is attached to the rear cushion frame 14B via the second wires 32 and the hooks 34. That is, the cloth spring member 22 is bridged between the front cushion frame 14A and the rear cushion frame 14B. As illustrated in FIG. 4, the length L1 of the side end edge 22B in a bridging direction of the cloth spring member 22 is shorter than the length L2 of an intermediate portion in the seat-width direction. In addition, "the length in the bridging direction" of the cloth spring member 22 in the embodiments of the disclosure means the length of a portion of the cloth spring member 22 in a state in which the cloth spring member 22 is bridged, that is, the length of a portion of the cloth spring member 22 that can exert an elastic force in the state in which the cloth spring member 22 is bridged. Therefore, for example, even when the second end portion 28 side of the cloth spring member 22 extends rearward of the second wire 32 in the bridging direction, the second end portion 28 side cannot become a free end and exert an elastic force. Therefore, the length of the portion extending rearward is excluded. The annular portion 28C into which the second wire 32 is inserted becomes the end portion of the length of the cloth spring member 22.

As illustrated in FIG. 1, in the seat back 40, up-down back frames 44 forming a pair are respectively disposed at both ends of the seat back 40 in the seat up-down direction. The up-down back frames 44 are disposed outward of both sides in the seat up-down direction of a back region 47 for the occupant as an example of the seat region with an interval therebetween. The up-down back frames 44 extend along the seat-width direction and form the frames of the seat back 40. The up-down back frame 44 on a lower side is referred to as a lower back frame 44A, and the up-down back frame 44 on an upper side is referred to as an upper back frame 44B. The cloth spring unit 20 described above is bridged between the up-down back frames 44.

The first end portion 26 side of the cloth spring unit 20 is disposed on the upper back frame 44B side, and the second end portion 28 side is disposed on the lower back frame 44A side. That is, the first end portion 26 side of the cloth spring member 22 is attached to the upper back frame 44B via the first wires 30 and the hooks 34. In addition, the second end portion 28 side of the cloth spring member 22 is attached to the lower back frame 44A via the second wires 32 and the hooks 34. That is, the cloth spring member 22 is bridged between the lower back frame 44A and the upper back frame 44B.

In the seat cushion 12 and the seat back 40, the load of the occupant is elastically supported by the cloth spring unit 20.

On the sides of the seat cushion 12 and the seat back 40 closer to the seated occupant than the cloth spring unit 20, a ventilation foam layer and a surface seat layer (not illustrated) are laminated.

Next, the operation of the first embodiment will be described.

When the occupant is seated on the vehicle seat 10, the thighs and hips of the occupant are supported by the seat cushion 12 from the lower side, and the upper part of the body of the occupant is supported by the seat back 40 from a rear surface side. Here, the cloth spring member 22 is elastically deformed by the load of the occupant.

In the seating region 17, both the outer sides in the seat-width direction of the cloth spring member 22 of the cloth spring unit 20 bridged between the cushion front-rear frames 14 have a shorter length in the bridging direction than a center portion of the cloth spring member 22 in the seat-width direction. In addition, even in the back region 47, both the outer sides in the seat-width direction of the cloth spring member 22 of the cloth spring unit 20 bridged between the up-down back frames 44 have a shorter length in the bridging direction than the center portion of the cloth spring member 22 in the seat-width direction. Therefore, both the outer sides in the seat-width direction of the cloth spring member 22, which are shorter, have a higher elastic modulus than the center portion of the cloth spring member 22 in the seat-width direction. Therefore, the side end edge 22B side of the cloth spring member 22 having a high elastic modulus can have a smaller deformation amount due to the load of the seated occupant than the center portion of the cloth spring member 22. Accordingly, the movement of the seated occupant in the seat-width direction can be restricted. In addition, in the first embodiment, the first end portion 26 side of the cloth spring member 22 is attached to the front cushion frame 14A via the first wires 30 and the hooks 34, and the second end portion 28 side of the cloth spring member 22 is attached to the rear cushion frame 14B via the second wires 32 and the hooks 34. However, the first end portion 26 side and the second end portion 28 side may be attached to the front cushion frame 14A and the rear cushion frame 14B with another configuration. For example, the hooks 34 may be directly attached to the first end portion 26 and the second end portion 28 of the cloth spring member 22 to attach the first end portion 26 and the second end portion 28 to the front cushion frame 14A and the rear cushion frame 14B via the hooks 34. Alternatively, the longitudinal directions of the front cushion frame 14A and the rear cushion frame 14B may be aligned with the first end portion 26 and the second end portion 28 of the cloth spring member 22 and the cloth spring member 22 may be directly attached to the front cushion frame 14A and the rear cushion frame 14B. The above-described configuration may also be applied to second to fourth embodiments and modification examples, which will be described later.

In the first embodiment, the second end portion 28 of the cloth spring member 22 is inclined such that the outer side of the second end portion 28 in the seat-width direction is directed toward the first end portion 26, but the aspects of the disclosure are not limited to the configuration. For example, a configuration in which the second end portion 28 of the cloth spring member 22 is inclined such that the outer side of the second end portion 28 in the seat-width direction in the plan view is directed toward the first end portion 26 while the first end portion 26 is inclined such that the outer side of the first end portion 26 in the seat-width direction in the plan view is directed toward the second end portion 28 may be employed. The above-described configuration may also be applied to the second to fourth embodiments and the modification examples, which will be described later.

Second Embodiment

Next, a second embodiment of the vehicle seat will be described. In the second embodiment, like elements similar to those of the first embodiment are denoted by like reference numerals, and detailed descriptions thereof will be omitted.

Figure 5:
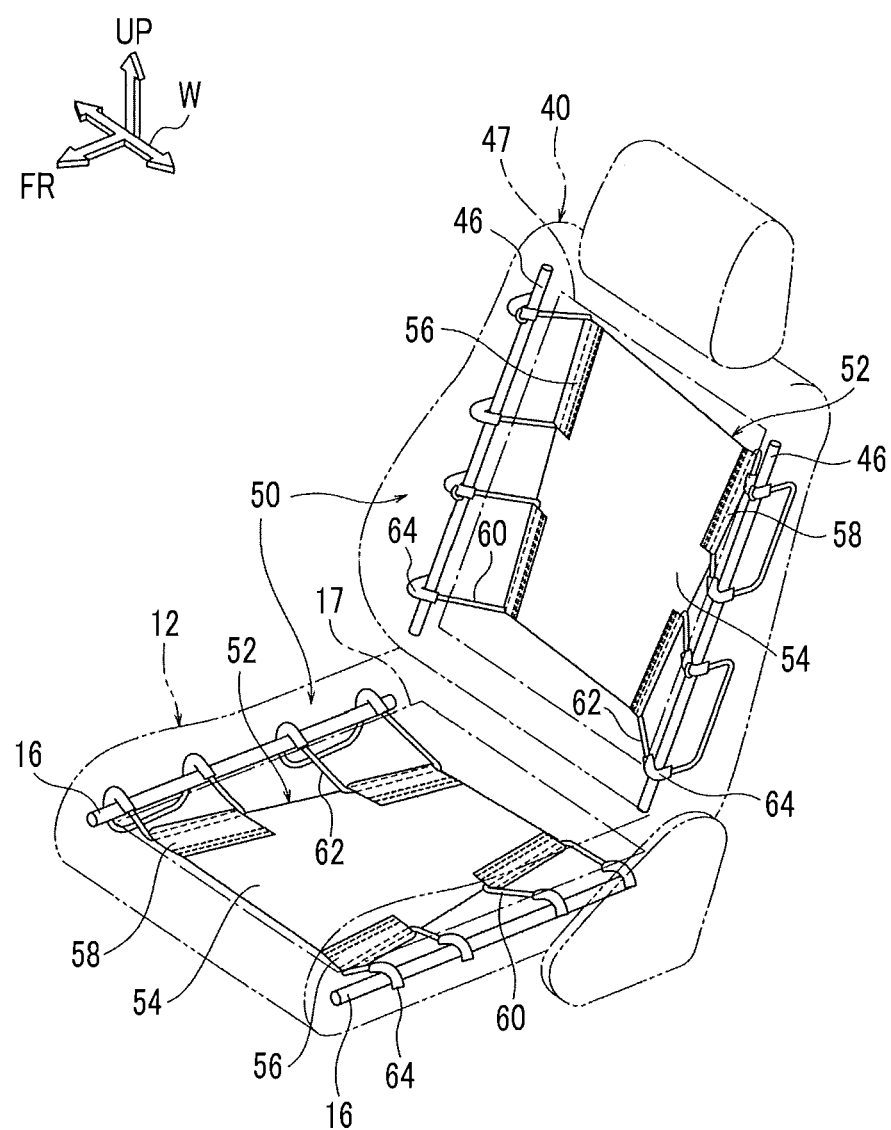
FIG. 5 is an overall schematic perspective view of a vehicle seat and a cloth spring unit according to a second embodiment.

As shown in FIG. 5, cushion side frames 16 forming a pair are respectively disposed at both ends of the seat cushion 12 in the seat-width direction. The cushion side frames 16 are disposed outward of both sides in the seat-width direction of the seating region 17 for the occupant with an interval therebetween. The cushion side frames 16 extend along the seat front-rear direction and form the frames of the seat cushion 12. A cloth spring unit 50 is bridged between the cushion side frames 16.

Figure 6:
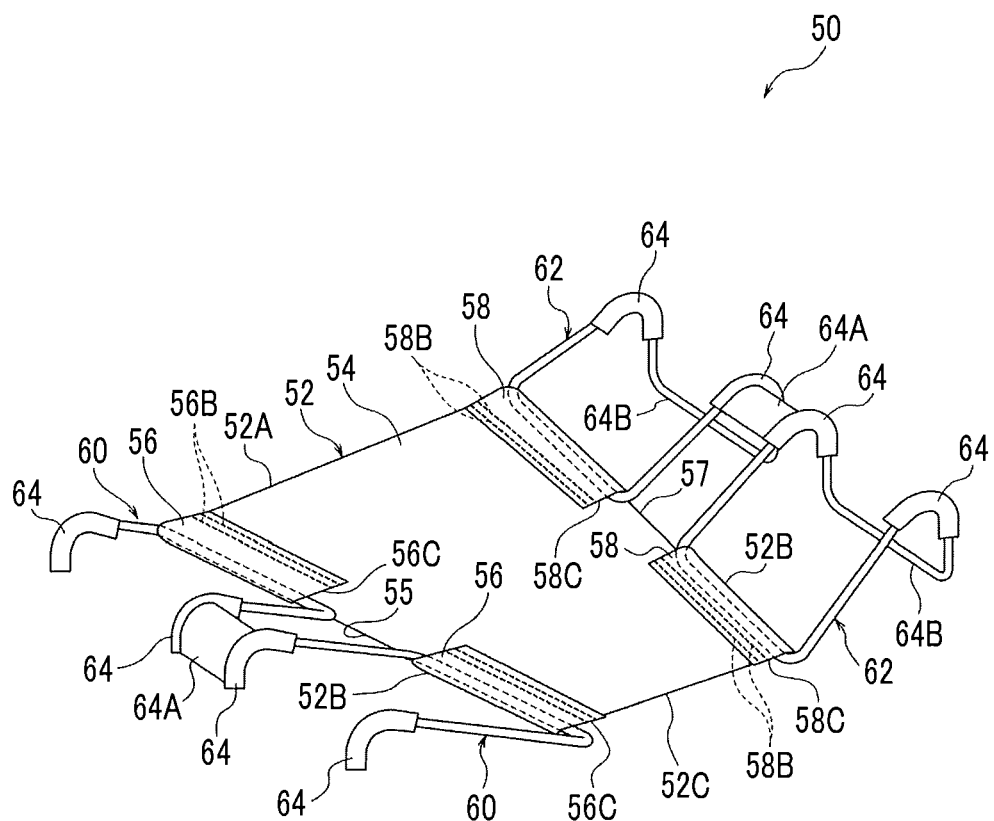
FIG. 6 is a perspective view of the cloth spring unit of the vehicle seat according to the second embodiment.

As illustrated in FIG. 6, the cloth spring unit 50 includes a cloth spring member 52, third wires 60, fourth wires 62, and hooks 64.

Figure 7:
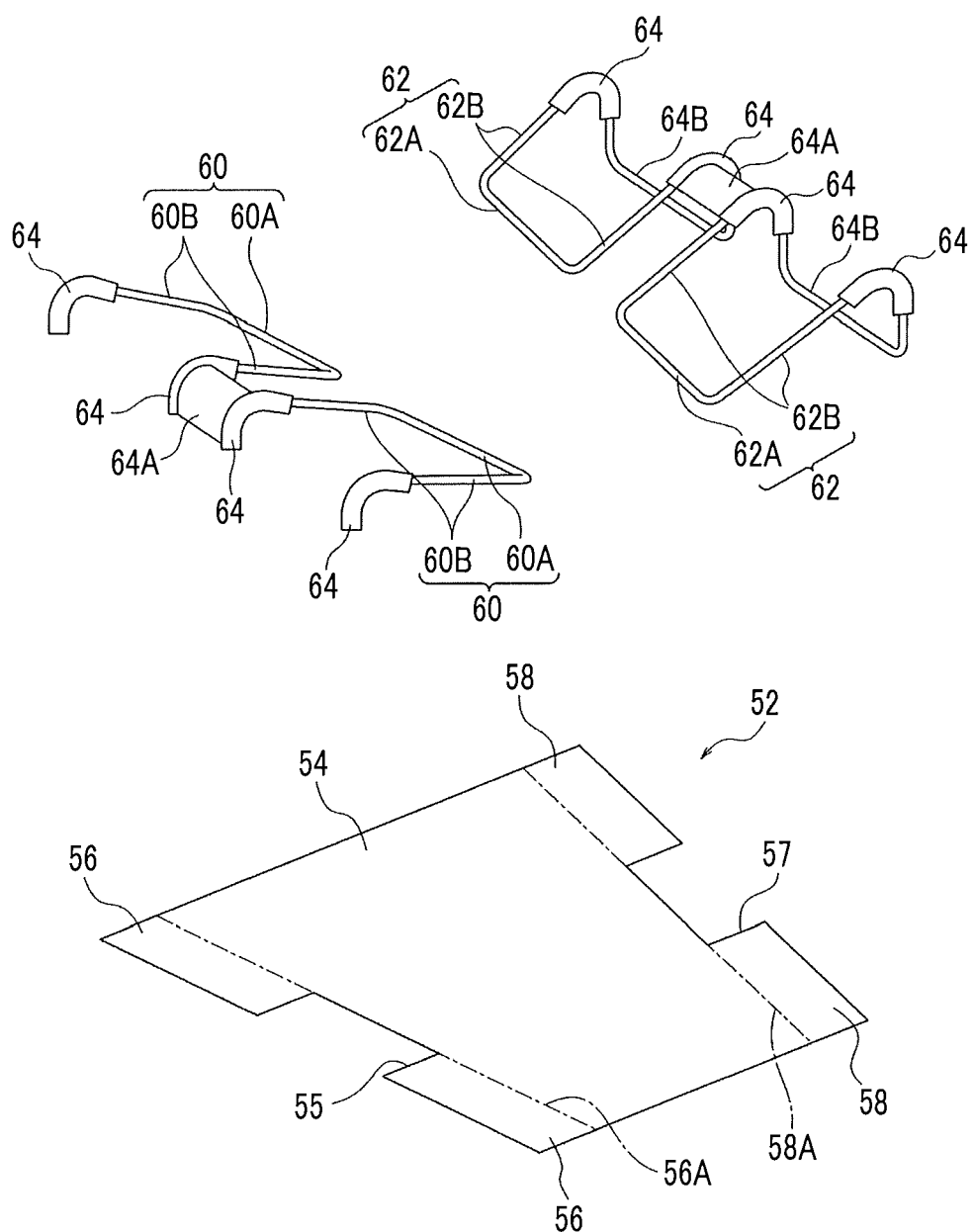
FIG. 7 is an exploded perspective view of the cloth spring unit of the vehicle seat according to the second embodiment.

The cloth spring member 52 is formed of an elastic cloth material such as elastic fabric, and as illustrated in FIG. 7, includes a cloth spring body portion 54, a first end portion 56, and a second end portion 58. The first end portion 56 is disposed on a first outer side of the cloth spring body portion 54 in the seat-width direction, and the second end portion 58 is disposed on a second outer side of the cloth spring body portion 54 in the seat-width direction.

The first end portion 56 and the second end portion 58 are inclined such that the seat front sides thereof are directed toward the outer side in the seat-width direction in the plan view. Cutouts 55, 57 are formed at the center of the first end portion 56 and the second end portion 58 in the longitudinal direction thereof.

The first end portion 56 is folded back toward the second end portion 58 at a folding line 56A and is sewn to the cloth spring body portion 54 at a sewing line 56B as illustrated in FIG. 6. The second end portion 58 is folded back toward the first end portion 56 at a folding line 58A and is sewn to the cloth spring body portion 54 at a sewing line 58B. On a side closer to the first end portion 56 than the sewing line 56B, annular portions 56C are formed by sewing the first end portion 56 to the cloth spring body portion 54. A side end edge 52B of the cloth spring member 52, which will be described later, is formed by the folding line 56A. On a side closer to the second end portion 58 than the sewing line 58B, annular portions 58C are formed by sewing the second end portion 58 to the cloth spring body portion 54. A side end edge 52B of the cloth spring member 52, which will be described later, is formed by the folding line 58A.

As illustrated in FIG. 6, the cloth spring member 52 includes, as outer edges in the plan view, a long end edge 52A disposed on the seat front side or the seat upper side, the side end edges 52B disposed on a first end side and a second end side in the seat-width direction, and a short end edge 52C disposed on the seat rear side or the seat lower side. The long end edge 52A and the short end edge 52C are disposed along the seat-width direction, and the side end edges 52B are disposed to be inclined along the folding lines 56A, 58A, respectively.

The third wires 60 are attached to the annular portions 56C of the cloth spring member 52. As illustrated in FIG. 7, the third wire 60 includes an insertion portion 60A and bridge portions 60B bent from both end portions of the insertion portion 60A. The insertion portion 60A is inserted into the annular portion 56C, and the bridge portions 60B extend outward of the cloth spring member 52 in the seat-width direction. The third wires 60 are respectively provided on both sides with the cutout 55 interposed therebetween. The length of the bridge portion 60B disposed on the seat front side is shorter than the length of the bridge portion 60B disposed on the seat rear side.

The hook 64 is provided at the tip portion of each of the bridge portions 60B. The hook 64 has a hook shape and is hooked to the cushion side frame 16 on the first end side. The hooks 64 provided at the bridge portions 60B that are adjacent to each other with the cutout 55 interposed therebetween are connected by a connection portion 64A.

The fourth wires 62 are attached to the annular portions 58C of the cloth spring member 52. The fourth wire 62 includes an insertion portion 62A and bridge portions 62B bent from both end portions of the insertion portion 62A. The insertion portion 62A is inserted into the annular portion 58C, and the bridge portions 62B extend outward of the cloth spring member 52 in the seat-width direction. The fourth wires 62 are respectively provided on both sides with the cutout 57 interposed therebetween. The length of the bridge portion 62B disposed on the seat front side is shorter than the length of the bridge portion 62B disposed on the seat rear side.

The hook 64 is provided at the tip portion of each of the bridge portions 62B. The hook 64 has a hook shape and is hooked to the cushion side frame 16 on the second end side. The tips of the hooks 64 of the fourth wires 62 are connected by connection portions 64B. In addition, the hooks 64 provided at the bridge portions 62B that are adjacent to each other with the cutout 57 interposed therebetween are connected by the connection portion 64A.

The first end portion 56 side of the cloth spring member 52 is attached to the cushion side frame 16 on the first end side via the third wires 60 and the hooks 64. In addition, the second end portion 58 side of the cloth spring member 52 is attached to the cushion side frame 16 on the second end side via the fourth wires 62 and the hooks 64. That is, the cloth spring member 52 is bridged between the cushion side frames 16.

As illustrated in FIG. 5, in the seat back 40, back side frames 46 forming a pair are respectively disposed at both ends of the seat back 40 in the seat-width direction. The back side frames 46 are disposed outward of both sides in the seat-width direction of the back region 47 for the occupant with an interval therebetween. The back side frames 46 extend along the seat up-down direction and form the frames of the seat back 40. The cloth spring unit 50 described above is bridged between the back side frames 46.

One end edge 52B on the first side of the cloth spring unit 50 is disposed toward the back side frame 46 that is on the first side, and the other side end edge 52B on the second side of the cloth spring unit 50 is disposed toward the back side frame 46 that is on the second side. That is, the first side of the cloth spring member 52 is attached to the back side frame 46 on the first side via the third wires 60 and the hooks 64. In addition, the second side of the cloth spring member 52 is attached to the back side frame 46 on the second side via the fourth wires 62 and the hooks 64. That is, the cloth spring member 52 is bridged between the back side frames 46.

Next, the operation of the second embodiment will be described. When the occupant is seated on the vehicle seat 10, the thighs and hips of the occupant are supported by the seat cushion 12 from the lower side, and the upper part of the body of the occupant is supported by the seat back 40 from the rear surface side. Here, the cloth spring member 52 is elastically deformed by the load of the occupant.

In the seating region 17, the length in the bridging direction of the cloth spring member 52 of the cloth spring unit 50 bridged between the cushion side frames 16 is shorter on the seat rear side than on the seat front side. Therefore, the seat rear side of the cloth spring member 52, which is shorter, has a higher elastic modulus than the seat front side thereof. Since the load of the seated occupant on the cloth spring member 52 is larger on the hip side than on the thigh side, by increasing the elastic modulus on the seat rear side, the cloth spring member 52 can stably receive the load of the seated occupant.

In addition, even in the back region 47, the length in the bridging direction of the cloth spring member 52 of the cloth spring unit 50 bridged between the back side frames 46 is shorter on the seat lower side than on the seat upper side. The cloth spring member 52 bridged in the seat-width direction increases in length toward the seat upper side from the seat lower side and decreases in elastic modulus toward the seat upper side. As described above, by decreasing the elastic modulus toward the seat upper side, the cushioning performance of the seat back 40 when the seated occupant rests on the seat back 40 can be enhanced.

In the second embodiment, although the cloth spring unit 50 is bridged between the cushion side frames 16 such that the length of the cloth spring member 52 in the bridging direction is shorter on the seat rear side than on the seat front side, the cloth spring unit 50 may also be bridged such that the length of the cloth spring member 52 in the bridging direction is longer on the seat rear side than on the seat front side by reversing the front and rear sides. In this case, the seat front side of the cloth spring member 52, which is shorter, has a higher elastic modulus than the seat rear side thereof. Therefore, the movement of the seated occupant toward the seat front side can be restricted, for example, during emergency braking.

In addition, in the second embodiment, although the cloth spring unit 50 is disposed in both the seat cushion 12 and the seat back 40, the cloth spring unit 50 may also be disposed in any one of the seat cushion 12 and the seat back 40. Furthermore, the cloth spring unit 20 of the first embodiment and the cloth spring unit 50 of the second embodiment may be appropriately combined for use. That is, the cloth spring unit 20 may be disposed in the seat cushion 12 and the cloth spring unit 50 may be disposed in the seat back 40. Alternatively, the cloth spring unit 50 may be disposed in the seat cushion 12 and the cloth spring unit 20 may be disposed in the seat back 40.

Third Embodiment

Next, a third embodiment of the vehicle seat will be described. The third embodiment is the same as the first embodiment except for the configuration of the cloth spring unit 50. Like elements similar to those of the first embodiment are denoted by like reference numerals, and detailed descriptions thereof will be omitted.

As illustrated in FIGS. 8A to 8C, a cloth spring unit 70 of the third embodiment includes the cloth spring member 22, the first wires 30, second wires 72, and the hooks 34. The cloth spring unit 70 of the third embodiment is the same as the cloth spring unit 20 of the first embodiment except for the configuration of the second wires 72.

The second wires 72 are attached to the annular portions 28C of the cloth spring member 22. As illustrated in FIGS. 8A to 8C, the second wire 72 includes an insertion portion 72A, a bridge portion 72B bent from a first end portion of the insertion portion 72A, and a bridge portion 72C bent from a second end portion of the insertion portion 72A. The insertion portion 72A is inserted into the annular portion 28C and is inclined such that the second end portion positioned on the outer side in the seat-width direction is positioned closer to the seat upper side than the first end portion positioned on the inner side in the seat-width direction. The bridge portion 72C extends outward of the cloth spring member 22 in the seat front-rear direction. On the other hand, the bridge portion 72B extends in the seat front-rear direction on the inner side of the cloth spring member 22 in the seat-width direction (on the cutout 27 side). The second wires 72 are respectively provided on both sides with the cutout 27 interposed therebetween. The length of the bridge portion 72B disposed on the center side in the seat-width direction is shorter than the length of the bridge portion 72C disposed on the outer side in the seat-width direction.

As illustrated in FIGS. 8A to 8C, since the cloth spring member 22 is attached to the second wires 72, a portion 22D having a lower height in the seat up-down direction than both ends of the cloth spring member 22 in the seat-width direction (the side end edges 22B) is formed on the seat rear side. Since the portion 22D having a lower position in the seat up-down direction than both ends of the cloth spring member 22 in the seat-width direction is formed in the cloth spring member 22, folds 22E are formed between the portion 22D which is lower in height and higher portions.

The cloth spring unit 70 in the third embodiment is bridged between the cushion front-rear frames 14 for use.

Next, the operation of the third embodiment will be described. The description of the operation obtained with the same configuration as in the first embodiment will be omitted.

In the third embodiment, the portion 22D having a lower height in the seat up-down direction than both ends of the cloth spring member 22 in the seat-width direction is formed at least on the seat rear side of the cloth spring member 22 by the second wires 72. The portion 22D having a lower height in the seat up-down direction has a lower deformation start position (bending start position) with respect to the load of the seated occupant than both ends of the cloth spring member 22 in the seat-width direction, and thus the seating pressure of at least the hip side of the seated occupant can be locally reduced. In particular, since the sides in the seat-width direction of the cloth spring member 22 outward of the folds 22E which are the boundaries of the portion 22D having a lower height in the seat up-down direction are at higher positions than the portion 22D having a lower height in the seat up-down direction, the seating pressure of the seated occupant on the portion 22D which is lower in height can be effectively reduced.

Figure 9:
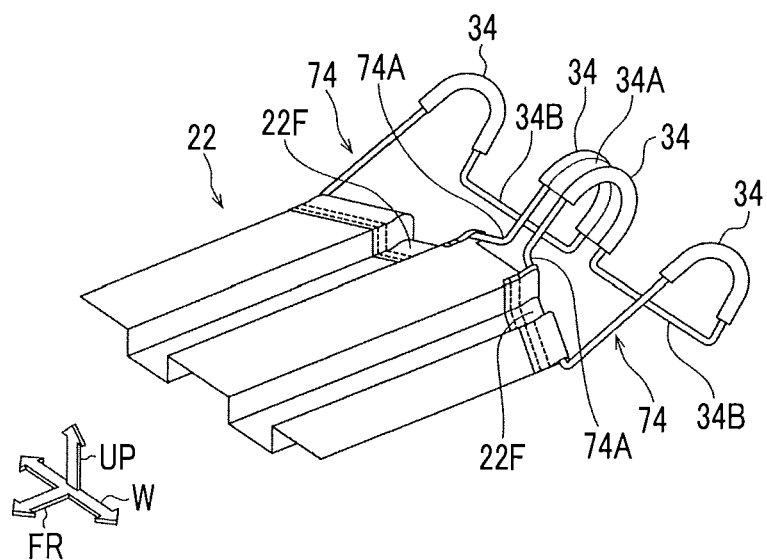
FIG. 9 is a perspective view illustrating a modification example of the cloth spring unit according to the third embodiment.

In the third embodiment, the insertion portion 72A of the second wire 72 is inclined such that the second end portion positioned on the outer side in the seat-width direction is positioned closer to the seat upper side than the first end portion positioned on the inner side in the seat-width direction, but the aspects of the disclosure are not limited to the configuration. For example, as in a second wire 74 of a modification example illustrated in FIG. 9, a recessed portion may be formed to be recessed toward the seat lower side by bending an insertion portion 74A. By forming the recessed portion in the second wire 74, a recessed portion 22F is also formed at a portion of the cloth spring member 22 corresponding to the recessed portion. Here, since the recessed portion 22F of the cloth spring member 22 has a lower height in the seat up-down direction than the other portions, the recessed portion 22F has a lower deformation start position (bending start position) with respect to the load of the seated occupant, and thus the seating pressure of at least the hip side of the seated occupant on the portion corresponding to the recessed portion 22F can be reduced. For example, in a case where the recessed portion 22F corresponds to the ischium, the ride comfort of the seated occupant is improved.

Figure 10:
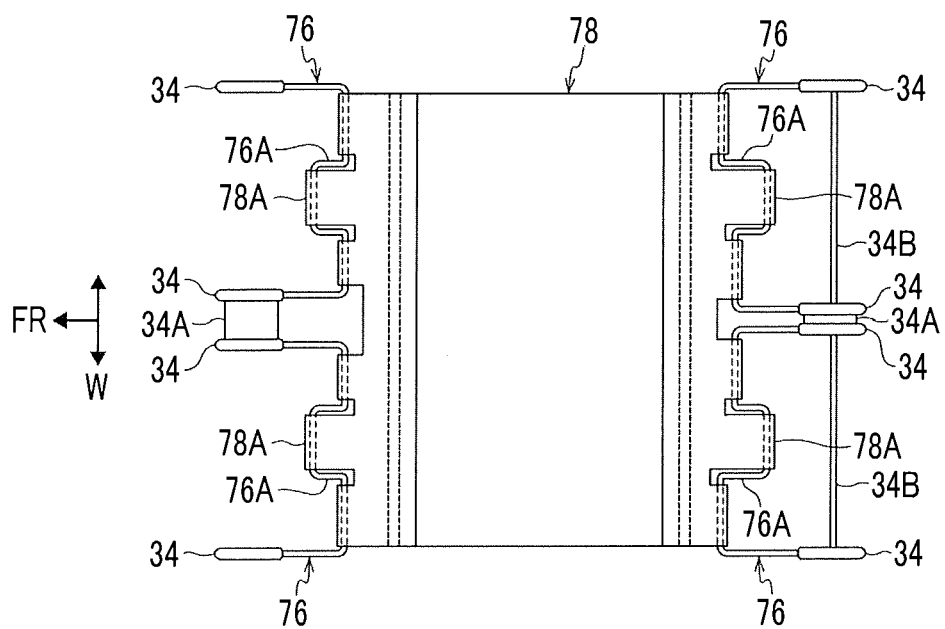
FIG. 10 is a plan view illustrating another modification example of the cloth spring unit according to the third embodiment.

In the third embodiment, the insertion portion 72A of the second wire 72 is inclined such that the second end portion positioned on the outer side in the seat-width direction is positioned closer to the seat upper side than the first end portion positioned on the inner side in the seat-width direction, but the aspects of the disclosure are not limited to the configuration. For example, as in a second wire 76 of another modification example illustrated in FIG. 10, a protruding portion may be formed to protrude toward the seat front side or the seat rear side by bending an insertion portion 76A. By forming the protruding portion in the second wire 76, a protruding portion 78A is formed at a portion of a cloth spring member 78 corresponding to the protruding portion of the second wire 76. Accordingly, the length of the cloth spring member 78 is increased in the bridging direction by the protruding portion 78A. As the ischium of the seated occupant is positioned at the portion corresponding to the protruding portion 78A, the ride comfort of the seated occupant is improved.

In the third embodiment, although the insertion portion 30A of the first wire 30 extends such that a second end portion of the insertion portion 30A positioned on the outer side in the seat-width direction is substantially at the same height in the seat up-down direction as a first end portion of the insertion portion 30A positioned on the inner side in the seat-width direction, the aspects of the disclosure are not limited to the configuration. For example, as in a cloth spring unit 110 of another embodiment of the disclosure illustrated in FIGS. 16A to 16D, the insertion portion of the first wire 112 may be inclined such that a second end portion of the insertion portion positioned on the outer side in the seat-width direction is positioned closer to the seat upper side than a first end portion of the insertion portion positioned on the inner side in the seat-width direction. With the configuration, the seating pressure of the seated occupant can be more effectively reduced. Furthermore, for example, as in a cloth spring unit 120 of another embodiment of the disclosure illustrated in FIGS. 17A to 17D, the insertion portion of the first wire 122 may extend from the first end portion of the insertion portion positioned on the inner side in the seat-width direction toward the second end portion of the insertion portion positioned on the outer side in the seat-width direction closer to the seat upper side than the first end portion of the insertion portion while not being changed in position in the seat up-down direction (remained at the same height in the seat up-down direction) and may be inclined partway to the second end portion of the insertion portion. With the configuration, the seating pressure of the seated occupant can be more effectively reduced.

Fourth Embodiment

Next, a fourth embodiment of the vehicle seat will be described. The fourth embodiment is the same as the second embodiment except for the configuration of a cloth spring unit 80. Like elements similar to those of the second embodiment are denoted by like reference numerals, and detailed descriptions thereof will be omitted.

Figure 11A:
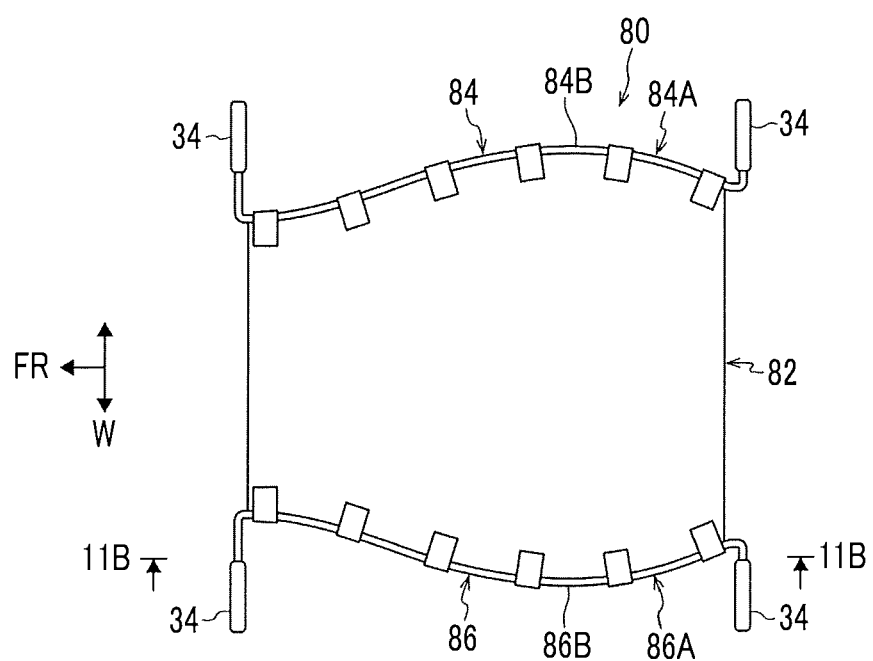
FIG. 11A is a plan view of a cloth spring unit of a vehicle seat according to a fourth embodiment.
Figure 11B:
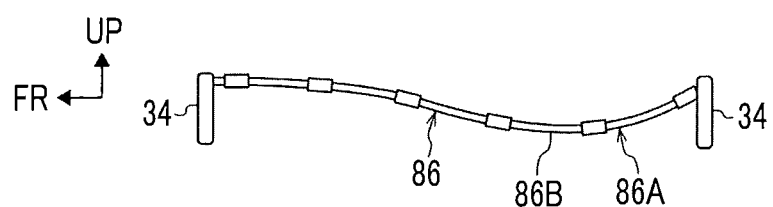
FIG. 11B is a view of the cloth spring unit in FIG. 11A when viewed from the arrow 11B.

As illustrated in FIGS. 11A and 11B, the cloth spring unit 80 of the fourth embodiment includes a cloth spring member 82, a first wire 84, a second wire 86, and the hooks 34.

The first and second wires 84, 86 are disposed with an interval in the seat-width direction therebetween. Both end portions of each of the first and second wires 84, 86 are bent outward in the seat-width direction, and the hooks 34 are attached to the tip portions of both the end portions. In insertion portions 84A, 86A of the first and second wires 84, 86 respectively inserted into both end portions of the cloth spring member 82 in the seat-width direction, curved portions 84B, 86B, which are curved in arc shapes in directions away from each other, are formed on the seat rear side. The curved portions 84B, 86B are curved so as to be convex toward the seat rear side as viewed in the seat-width direction.

The cloth spring member 82 is formed of the same material as the cloth spring member 52 of the second embodiment. Both the end portions of the cloth spring member 82 in the seat-width direction are respectively attached to the first and second wires 84, 86.

Next, the operation of the fourth embodiment will be described. The description of the operation obtained with the same configuration as in the second embodiment will be omitted.

In the fourth embodiment, the curved portions 84B, 86B which are convex toward the seat lower side as viewed in the seat-width direction are formed on the seat rear side of the first and second wires 84, 86. Therefore, the portions of the cloth spring member 82 corresponding to the curved portions 84B, 86B tend to fit the hips of the seated occupant, and thus can restrict the movement of the seated occupant in the seat front-rear direction. In addition, since the width between the curved portions 84B, 86B in the seat-width direction increases from the seat front side toward the seat rear side, the hips are more likely to be fitted while the seating pressure of the thighs of the seated occupant is reduced, and the movement of the seated occupant in the seat front-rear direction can be more effectively restricted.

Furthermore, since the first and second wires 84, 86 are smoothly curved, the seating pressure of the seated occupant can be smoothly (continuously) changed. Accordingly, the sensation of seating pressure continuity of the seated occupant is improved.

Figure 12:
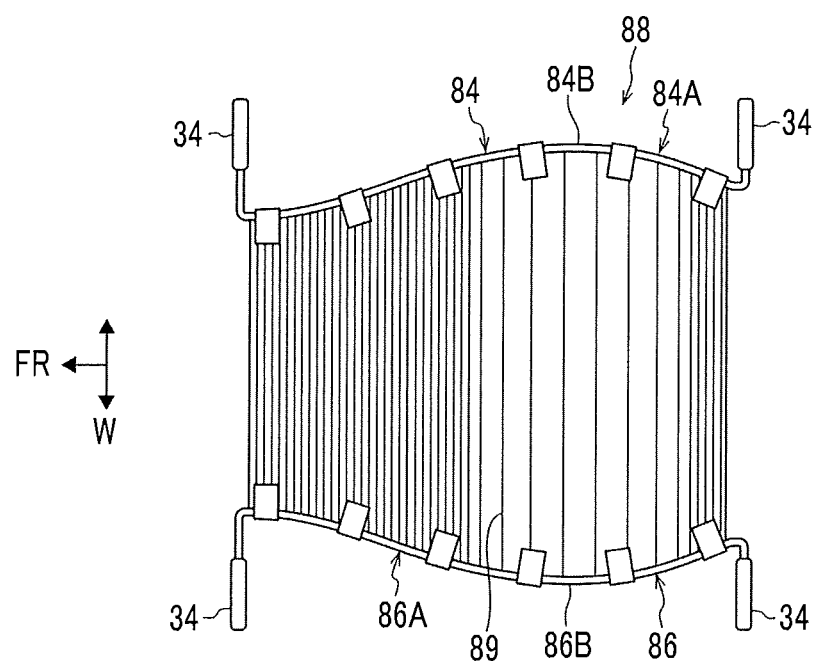
FIG. 12 is a plan view of a modification example of the cloth spring unit of the vehicle seat according to the fourth embodiment.

In the fourth embodiment, the cloth spring member 82 similar to the cloth spring member 52 of the second embodiment is used, and the density (arrangement interval) of the warp yarns and the density (arrangement interval) of the weft yarns are substantially constant, but the aspects of the disclosure are not limited to the configuration. For example, as in a cloth spring member 88 illustrated in FIG. 12, a configuration in which the density of warp yarns 89 of an elastic fiber forming the cloth spring member 88 is high on the seat front side and is low on the seat rear side may be employed. With the configuration, the seating pressure of a portion positioned at the thigh can be increased while the seating pressure of a portion positioned at the hips of the seated occupant is reduced. The configuration in which the density of the warp yarns of the elastic fiber is changed may also be applied to the first to third embodiments and the modification examples. For example, in a case where the configuration is applied to the first embodiment, a cloth spring member 90 of a modification example illustrated in FIG. 13 is formed. In the cloth spring member 90, the density of warp yarns 91 at the center portion and both end portions of the cloth spring member 90 in the seat-width direction is high, and the density of warp yarns 91 between the center portion and both the end portions of the cloth spring member 90 in the seat-width direction is low. With the configuration, the density of the warp yarns 91 is low under the ischium of the seated occupant, resulting in an improvement in ride comfort. In addition, in FIG. 12, the warp yarns 89 are illustrated so that the arrangement interval of the warp yarns 89 vary extremely so as to facilitate the determination of whether the density of the warp yarns 89 is high or low. Also in FIG. 13, as in FIG. 12, the warp yarns 91 are illustrated so that the arrangement interval of the warp yarns 91 vary extremely so as to facilitate the determination of whether the density of the warp yarns 91 is high or low.

Figure 14A:
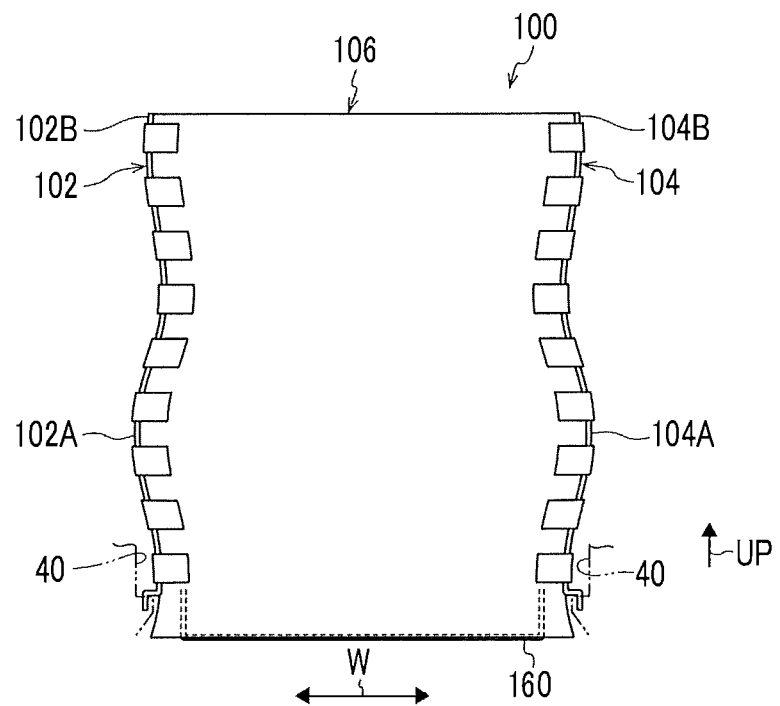
FIG. 14A is a plan view of the cloth spring unit of the vehicle seat according to the fourth embodiment.
Figure 14B:
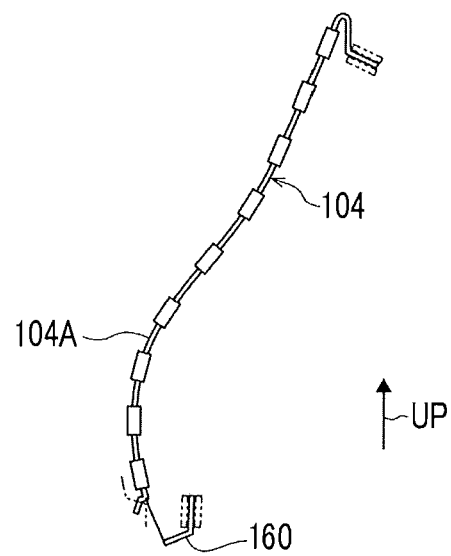
FIG. 14B is a view of the cloth spring unit in FIG. 14A when viewed from the arrow 14B.
Figure 15:
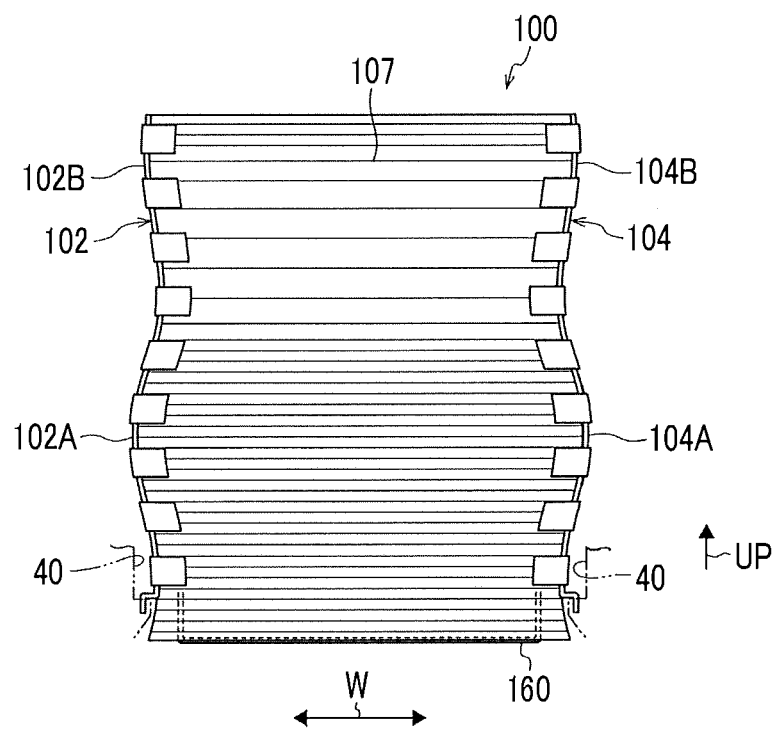
FIG. 15 is a plan view of a modification example of the cloth spring unit of the vehicle seat according to the fourth embodiment.

Furthermore, in the fourth embodiment, the configuration in which the cloth spring unit 80 is attached to the cushion side frames 16 is employed, but the aspects of the disclosure are not limited to the configuration. For example, a configuration in which the cloth spring unit 80 is attached to the back side frame 46 may also be employed. Alternatively, a configuration in which a cloth spring unit 100 illustrated in FIG. 14A instead of the cloth spring unit 80 is attached to the back side frame 46 may be employed. In a first wire 102 and a second wire 104 of the cloth spring unit 100, curved portions 102A, 104A which are curved in arc shapes widening in directions away from each other are formed from the seat lower side toward an intermediate portion of the cloth spring unit 100, and curved portions 102B, 104B which are curved in arc shapes widening in directions away from each other are formed from the intermediate portion of the cloth spring unit 100 toward the seat upper side. The curved portions 102A, 104A are curved so as to be convex toward the seat upper side from the seat lower side. Both end portions of the first, second wires 102, 104 are respectively attached to the back side frames 46. A cloth spring member 106 is attached to the first, second wires 102, 104. In the modification example, a third wire 160 extending in the seat-width direction is attached to the seat lower side of the cloth spring member 106. With the configuration, holding properties of the portions of the cloth spring member 106 corresponding to the curved portions 102A, 104A, that is, for the waist of the seated occupant are improved. On the other hand, the cushioning properties of the portions of the cloth spring member 106 corresponding to the curved portions 102B, 104B, that is, for the shoulder of the seated occupant are improved. Furthermore, by allowing weft yarns 107 of the cloth spring member 106 of the modification example to be dense at positions corresponding to the curved portions 102A, 104A and allowing the weft yarns 107 to be sparse at positions corresponding to the curved portions 102B, 104B, the cushioning properties for the shoulder of the seated occupant are further improved (see FIG. 15).

While the embodiments of the disclosure have been described above, the aspects of the disclosure are not limited to the above description, and it is natural that various modifications can be made in a scope of the disclosure.

What is claimed is:

1. A vehicle seat, comprising:
   a pair of frame members, the frame members forming a frame of at least one of a seat cushion and a seat back and being disposed at positions surrounding a seat region with an interval between the frame members;
   a cloth spring member bridged between the frame members along a bridging direction to cover the seat region;
   a first wire that attaches the cloth spring member to a first frame member of the pair of frame members; and
   a pair of second wires that attaches the cloth spring member to a second frame member of the pair of frame members, wherein:

the cloth spring member has a shorter length in the bridging direction at least on one end of the cloth spring member in a seat-width direction of the vehicle seat than at a center portion of the cloth spring member in the seat-width direction, the cloth spring member has elasticity, and each of the second wires include an insertion portion inserted into the cloth spring member that is inclined downward in a seat up-down direction from respective ends of the cloth spring member in the seat-width direction to the center portion of the cloth spring member.

2. The vehicle seat according to claim 1, wherein:

the frame members include a pair of cushion front-rear frames extending in the seat-width direction with an interval therebetween in a seat front-rear direction at positions surrounding the seat region; and the length in the seat front-rear direction of the cloth spring member bridged between the cushion front-rear frames decreases toward an outer side in the seat-width direction from a center portion of the cloth spring member in the seat-width direction.

3. The vehicle seat according to claim 2, wherein a density of warp yarns of an elastic fiber forming the cloth spring member is higher at the center portion and both end portions of the cloth spring member in the seat-width direction than between the center portion and both the end portions of the cloth spring member in the seat-width direction and is low between the center portion and both the end portions of the cloth spring member in the seat-width direction.

4. The vehicle seat according to claim 1, further comprising:

an attachment member that causes the first wire to be attached to the frame member, wherein:

an annular portion is formed in the cloth spring member by folding and sewing an end edge of the cloth spring member along the frame member; and the first wire is inserted into the annular portion to support the end edge of the cloth spring member.

5. The vehicle seat according to claim 1, wherein:

the frame members include up-down back frames extending in the seat-width direction with an interval therebetween in the seat up-down direction at positions surrounding a back region; and the length in the seat up-down direction of the cloth spring member bridged between the up-down back frames decreases toward an outer side in the seat-width direction from the center portion of the cloth spring member in the seat-width direction.

6. The vehicle seat according to claim 1, wherein:

the frame members include back side frames extending in the seat up-down direction with an interval therebetween in the seat-width direction at positions surrounding a back region; and the length in a seat-width direction of the cloth spring member bridged between the back side frames increases toward a seat upper side from a seat lower side in the seat up-down direction.

7. The vehicle seat according to claim 1, wherein:

the frame members include a pair of cushion side frames extending in a seat front-rear direction with an interval therebetween in the seat-width direction at positions surrounding the seating region; and the length in the seat-width direction of the cloth spring member bridged between the cushion side frames increases toward a seat front side from a seat rear side in the seat front-rear direction.

8. The vehicle seat according to claim 7, further comprising:

an attachment member that causes the first wire to be attached to the frame member, wherein:

an annular portion is formed in the cloth spring member by folding and sewing an end edge of the cloth spring member along the frame member; and the first wire is inserted into the annular portion to support the end edge of the cloth spring member.

9. The vehicle seat according to claim 7, wherein a portion of the cloth spring member, which has a lower height in the seat up-down direction than both ends of the cloth spring member in the seat-width direction, is formed at least on a seat rear side of the cloth spring member.

10. A vehicle seat, comprising:

a pair of frame members, the frame members forming a frame of at least one of a seat cushion and a seat back and being disposed at positions surrounding a seat region with an interval between the frame members;

a cloth spring member bridged between the frame members along a bridging direction to cover the seat region;

the cloth spring member has a shorter length in the bridging direction at least on one end of the cloth spring member in a seat-width direction of the vehicle seat than at a center portion of the cloth spring member in the seat-width direction, the cloth spring member has elasticity, the frame members include a pair of cushion front-rear frames extending in the seat-width direction with an interval therebetween in a seat front-rear direction at positions surrounding the seating region, the length in the seat front-rear direction of the cloth spring member bridged between the cushion front-rear frames decreases toward an outer side in the seat-width direction from a center portion of the cloth spring member in the seat-width direction, and wherein a portion of the cloth spring member, which has a lower height in a seat up-down direction than both ends of the cloth spring member in the seat-width direction, is formed at least on a seat rear side of the cloth spring member.

* * * * *